United States Patent [19]
Elliot et al.

[11] 3,893,839
[45] July 8, 1975

[54] TELEPHONE CABLE FILLING COMPOSITION

[76] Inventors: Frederick Cartmer Elliot; Reginald Arthur Hunn, both of c/o Campbell Technical Waxes Limited, Thames Rd., Crayford, England

[22] Filed: Mar. 21, 1974

[21] Appl. No.: 453,191

[52] U.S. Cl. .............................. 106/272; 117/231
[51] Int. Cl. .............................................. C08h 9/10
[58] Field of Search ................. 106/272; 117/231

[56] References Cited
UNITED STATES PATENTS

| | | | |
|---|---|---|---|
| 2,586,345 | 2/1952 | King | 260/28.5 A |
| 2,857,350 | 10/1958 | Thompson | 260/28.5 A |
| 2,867,596 | 1/1959 | Bennett | 260/28.5 A |
| 2,914,430 | 11/1959 | King et al. | 106/270 |
| 2,956,036 | 10/1960 | King | 260/28.5 A |

FOREIGN PATENTS OR APPLICATIONS

| | | |
|---|---|---|
| 955,348 | 4/1964 | United Kingdom |
| 1,120,011 | 7/1968 | United Kingdom |
| 877,895 | 9/1961 | United Kingdom |

OTHER PUBLICATIONS

Condensed Chemical Dictionary, 8th Edition, July 1971, page 783.

*Primary Examiner*—Theodore Morris
*Attorney, Agent, or Firm*—Kenyon & Kenyon Reilly Carr & Chapin

[57] ABSTRACT

A composition suitable for use in filling telephone cables is disclosed, which comprises:

1. a high viscosity mineral oil, e.g. brightstock oil, having the following general physical characteristics:

| | |
|---|---|
| Viscosity/98.8°C. | 120 SUS – 220 SUS |
| Viscosity/37.8°C. | 2000 SUS – 3500 SUS |
| Flash Point | 204.4°C. minimum |
| Specific Gravity/15.6°C. | 0.875 – 0.925 |
| Colour | ASTM 2 – ASTM 8 |
| Boiling Range (at atmospheric pressure) | 260°C. – 704.5°C. |

2. microcrystalline wax, e.g., microcrystalline slackwax;

3. one or more waxes different from (2) above, and selected from the following: (a) paraffin waxes having melting points in the range of 38°–74°C., (b) synthetic Fischer-Tropsch type waxes having melting points in the range of 71°–120°C., and (c) natural waxes selected from the group Beeswax, Carnauba wax, Chinese insect wax, Japan wax, Myrtle wax and Spermaceti wax;

4. polybutene, of average molecular weight in the range of 500–3500; and 5. finely divided silica, the silica being present in an amount ranging from about 0.5 to about 8.0% by weight of the composition. The high viscosity mineral oil is present in a greater proportion than that of any ingredient, and comprises, for example about 50.0–70.0% by weight of the composition.

The high viscosity mineral oil and microcrystalline wax are blended together, with heating (e.g., to about 110°C.) and this blend is treated with an adsorbent such as activated clay to remove color and polar bodies. To this treated blend is added the second different type of wax, and the batch is stirred until the the wax is dissolved. Then the finely divided silica (silica flour) is added in small increments and thoroughly dispersed with high speed, high shear stirring until complete uniformity is achieved. Finally the polybutene is added and mixed into the batch.

27 Claims, 1 Drawing Figure

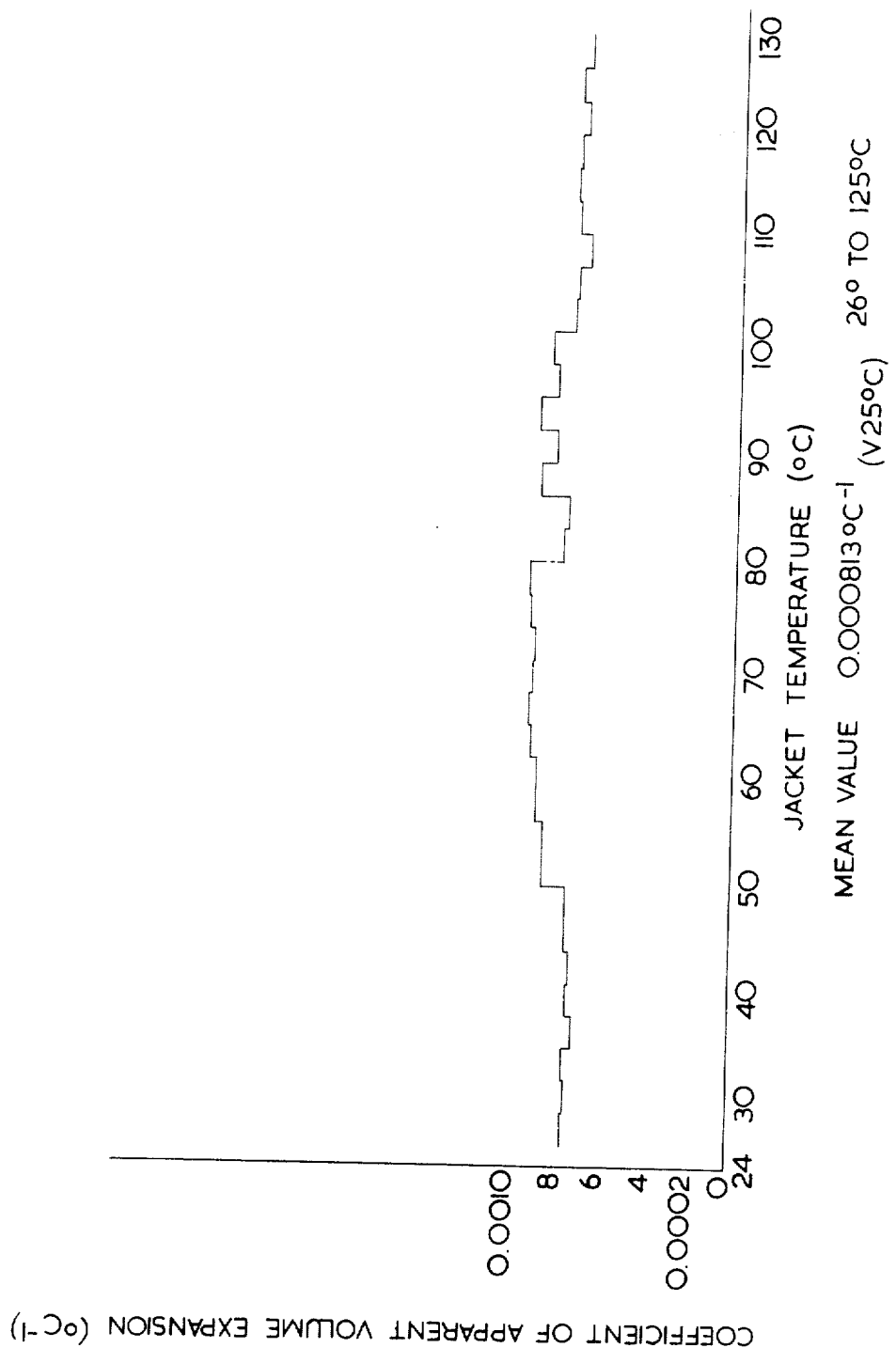

TELEPHONE CABLE FILLING COMPOSITION

This invention relates to compositions for the filling of telecommunciations cables, particularly buried cables which are subject to the ingress of water, or to entry and condensation of water vapor. Such water might flow through the cable and degrade its electrical properties.

The communications controller and signal cables to which the compositions of this invention are applicable are of the type comprising a multiplicity of conductors each having a dielectric of plastic material, a waterproof sheath enclosing the insulated conductors and, filling the interstices between these insulated conductors and between then and the cable sheath from end to end of the cable length, a water-impermeable medium which will not drain under the influence of gravity or such hydrostatic pressure as may arise in the event of damage to the cable sheath but which will permit relative sliding movement of the plastics insulated conductors over one another during such bending of the cable as occurs during manufacture and installation of the cable.

Water or water vapor often enters a (2) in the cables's outer jacket. These punctures may be the result of lightning strikes, mechanical damage to the cable sheath or joints or of initial defects incurred during production of laying of cable. One way which has been employed to minimize water ingress is to sheath the cable interior with water and vapor barriers. Such barriers, however, are expensive. Also, such barriers, once they are penetrated, permit the entry of water which migrates along the cable through interstices between the cable's conductors, and deteriorates its electrical qualities. Such deterioration manifests itself as an increase in the capacitance between cable conductors and results in increased losses and in severe cases erosion leading to breaks in a conductor can occur. In telephone communication cables such losses can seriously degrade the operating performance of a telephone system.

It is known to fill the interstices of multiconductor telephone cables with water blocking compounds in order to prevent water introduced into the cables which are installed in ducts or directly buried in the ground, as a result of damage to the cable sheath, travelling along the interior of the cable from the point of entry and thus adversely affecting its electrical characteristics along its whole length. Various blocking compounds are known for this purpose, among them being bodies mastic materials and jelly like substances, such as petroleum jelly.

The material used in the substance filling the interstices is preferably of such a consistency that when applied to the cable, the substance adheres to the conductors and the sheath well enough to prevent the formation of water passages along the surfaces of the conductors or the inner surfaces of the sheath and also does not significantly reduce the flexibility of the cable. It is important that the water-blocking compound be of such a consistency at the cable operating temperature that in the event of damage to the cable sheath it will not exude from the cable thus permitting the entry of water into the cable.

Other compositions for filling telecommunications cables to inhibit or prevent the ingress of water are known. Examples of such compositions are those comprising mixtures of a mineral oil and microcrystalline wax and/or synthetic hydrocarbon waxes, as described for instance in Albert King's U.S. Pat. Nos. 2,914,430 and 2,956,036 and British Patent Specification Nos. 877,895 and 955,348 of Sargent et al. These and other known cable filling compositions do work reasonably well in fulfilling their intended purpose and have been widely used; but nevertheless have certain drawbacks. More specifically, previously known telecommunications cable filling compositions have one or more of the following drawbacks:

a. Poor compatibility with the plastic materials used for insulating the cable pairs.

b. Frequently previous compounds were of low melting point and poor cohesive (internal) strength which render them unacceptable for use in cables where high temperatures could be met in service.

c. Excessive hardness at low temperature with the concomitant difficulty of handling filled telephone cables during colder weather installation.

d. Poorly chosen ingredients, some or all of which often exhibit exceptionally harmful effects on the plastic materials used to insulate the cable pairs (see (a) above).

e. The tendency for the components to separate (i.e., syneresis) due to poorly chosen base oils/polymers or improper blending techniques.

f. Low resistance to manual working resulting in a physical degradation of the compound to the point where its high temperature characteristics, especially drainage and water barrier characteristics are seriously harmed.

The ideal characteristics one should look for in a telephone cable filling compositions for use in conditions where the cable may be subjected to a wide range of temperatures during operation can be listed as follows:

1. It should have a high melting point, that is, above 80°C., so that, when it is subjected to high ambient temperatures such as may be encountered during operation of the cable, it will not liquify and thus tend to exude from the cable.

2. It should exhibit plasticity at very low temperatures, for example at −40°C.

3. It should exhibit a minimum degree of syneresis, i.e., separation of liquid components from solid components.

4. It should exhibit minimum void formation on contraction.

5. It should exhibit a minimum change of dielectric constant with increase in frequency.

6. It should have a low value for the dielectric constant (permittivity)— below 2.4 at 20°C.

7. It should have maximum compatibility with primary insulting materials such as the plastics which are used for the cable sheathing and for enclosing the conductors.

8. It should have a liquid viscosity low enough that the cable interstices can be readily filled during the cable manufacturing operation, yet sufficiently high that the material would not exude from the cable during manufacture or in the event of damage to the cable sheath.

9. It should be free from moisture and other polar contaminants all of which have an adverse effect on the performance of the finished telephone cable.

10. It should have sufficient internal strength or "internal cohesive force" to withstand the pressure effect of a moderately high head of water at elevated temperatures, i.e., significantly above normal ambient temperature, eg. 50°–70°C.

Known filling materials for use in cables, and in particular, those heretofore used in multiconductor telecommunications cables, are deficient in one or more of the above characteristics. Thus there has been a continuing search for improved cable filling compositions which would overcome the deficiencies of known compositions of this type and have characteristics more nearly approaching the ideal characteristics noted above.

An objective of the present invention is to provide cable filling compositions which substantially eliminate or at least minimize, the ingress of water into telecommunications cables in the event of mechanical or electrical damage to the cable sheath.

Another objective of this invention is to provide cable filling compositions which at least approach the ideal for compositions of this type, and which are free from at least some of the drawbacks of known cable filling compounds.

We have found that these objectives can be met by providing a composition which comprises, broadly, a mixture of (1) a high viscosity mineral oil such as brightstock oil, (2) microcrystalline wax, (3) at least one other different type of wax, (4) a low molecular weight liquid polybutene, and (5) finely divided silica, the latter ingredient being present in an amount ranging from about 0.5 to about 8.0 percent by weight of the composition. The silica serves as a gelling agent for binding the other ingredients into a gel structure.

Thus, in one broad aspect the present invention resides in a composition suitable for use in filling telecommunication cables, and the like, comprising: (1) a high viscosity mineral oil; (2) microcrystalline wax; (3) at least one wax selected from the group consisting of (a) paraffin waxes having melting points in the range of 37.8° – 79.4°C., (b) synthetic Fischer-Tropsch type waxes having melting points in the range of 71.1° – 115°C. and (c) natural waxes selected from the group: Beeswax, Carnauba wax, Chinese insect wax, Japan wax, Myrtle wax and Spermaceti wax: (4) polybutene, of average molecular weight in the range of 500–3,500; and (5) finely divided silica, said silica being present in an amount of from about 0.5 to about 8.0 percent by weight of said composition; said high viscosity mineral oil meeting the following general specification:

Viscosity/98.8°C. — 120 SUS – 220 SUS
Viscosity/37.8°C. — 2000 SUS – 3500 SUS
Flash Point - 204.4°C. Minimum
Specific Gravity/15.6°C — 0.875 – 0.925
Color ASTM 2– ASTM 8
Boiling Range (at atmospheric pressure) 260° – 704.5°C., there being a greater proportion by weight of said high viscosity mineral oil in said composition than that of any other ingredient.

Preferably the high viscosity mineral oil is brightstock oil, and the micro-crystalline wax is microcrystalline slack wax. Microcrystalline slack waxes are of variable composition; however normally such a material would have a mineral oil content of 10 – 40 percent and have a congealing point of 54° – 80°C., the waxes present being of microcrystalline structure. Microcrystalline waxes, as is well known, are composed of saturated hydrocarbon compounds of 40 to 50 carbon atoms with average molecular weight of 500 to 800. In contrast to the paraffinic waxes, microcrystalline waxes cannot be distilled at atmospheric pressure without some decomposition. The compounds are largely branched chain molecules with the branches occurring at random along the carbon chain. These waxes have a crystal structure much smaller than that of paraffin wax. The melting point of refined microcrystalline waxes is typically in the range of 62.8° – 90.5°C.

Brightstock oils are high V.I. (viscosity index) mineral oils which meet the general specification previously listed, namely:

Viscosity/98.8°C — 120 SUS – 220 SUS
Viscosity/37.8°C — 2000 SUS – 3500 SUS
Flash Point — at least 204°C.
Specific Gravity/15.6°C. — 0.875 – .925
Colour ASTM 2–ASTM 8
Boiling Range (at atmospheric pressure) 260° – 704°C.

(The abbreviation SUS signifies Saybolt Universal Seconds). Other mineral oils besides brightstock oil, e.g., neutral and pale oils, may be used in the compositions of this invention, provided they have physical characteristics similar to those given above.

A suitable composition according to the present invention may have a formulation as follows:

High Viscosity Mineral Oil — 50.0 – 70.0%
Microcrystalline Slack Wax — 5.0 – 20.0%
Fischer-Tropsch Synthetic Paraffinic Wax — 3.0 – 10.0%
Polybutene (of average molecular weight in the range of 500– 3500) — 5.0 – 15.0%
Silica Flour — 0.5 – 5.0 percent The above percentages of ingredients are by weight, based on the total composition.

More particularly the present invention resides in a composition suitable for use in filling telecommunications cables or the like, having the following formulation:

High Viscosity Mineral Oil — 60.0 – 70.0%
Microcrystalline Slack Wax 10.0 – 20.0%
Polybutene (of average molecular weight 2700) —5.0 – 15.0 percent
Fischer-Tropsch Synthetic Paraffinic Wax —5.0 – 10.0%
Silica Flour —1.0 – 5.0%

The above percentages of the ingredients are by weight, based on the total composition.

The telephone cable filling compositions of this invention are designed to fill the cable in such a manner that in the event of sheath failure water will not penetrate into the interior of the cable, thereby damaging or even destroying completely the transmission characteristics of the cable. The compositions of the present invention are designed to have sufficiently high structural "internal cohesive strength" to resist a 3 ft. head of water pressure. This is an important feature, for as will be appreciated it would not be of much value to fill a buried telephone cable with an oil/wax/polymer composition of the type disclosed herein if that composition, at the ambient temperatures involved, could be extruded from the cable by dint of external water pressure applied following sheath damage.

In another broad aspect, this invention resides in a process for preparing a composition suitable for use in filling telecommunication cables, and the like, comprising the following steps in sequence: (a) blending together with heating, the following ingredients: (i) a high viscosity mineral oil meeting the general specification:

Viscosity/98.8°C. — 120 SUS - 220 SUS
Viscosity/37.8°C. — 2000 SUS - 3500 SUS
Flash Point — 204.4°C. Minimum
Specific Gravity/15.6°C. — 0.875 - 0.925
Colour ASTM 2 - ASTM 8
Boiling Range (at atmospheric pressure) — 260°-704°C. and (ii) microcrystalline wax; (b) adding to the blend a wax selected from (i) paraffin waxes having melting points in the range of 38°-74°C. (ii) synthetic Fischer-Tropsch type waxes having melting points in the range of 71° - 120°C., and (iii) natural waxes selected from the group: Beeswax, Carnauba wax, Chinese insect wax, Japan wax, Myrtle wax, and Spermaceti wax, and allowing said wax to dissolve; (c) adding finely divided silica in small increments to the mixture, while subjecting the latter to high velocity, high shear mixing, until complete dispersion of said silica in the mixture is achieved, the amount of said finely divided silica used ranging from about 0.5 to about 8.0 percent by weight of the composition; and (d) incorporating into the mixture resulting from step (c), polybutene of average molecular weight in the range of 500– 3,500; said high viscosity mineral oil being employed in an amount greater than that of any other constituent in the composition.

The compositions of the present invention have the following physical characteristics:

| | |
|---|---|
| Viscosity (Brookfield)/98.8° C. (ASTM D2669) | 150–400 c.p.s. |
| Cone Penetration/25°C (ASTM D937 Method) | 80–120 1/10mm units |
| Drop Point (ASTM D127 Method) | 85–95°C. |
| Dissipation Factor/100°C Hz | 0.005 Maximum |
| Volume Resistivity/100°C. (ASTM D257) | $1 \times 10^{10}$ ohms meter minimum |

Our compositions are also characterized by exhibiting properties of a nature similar to those encountered in thixotropic materials. The term "thixotropic" is used herein to denote the property of certain materials to change rapidly, on standing from a liquid into a gel-like solid mass or body having sufficient cohesive strength to withstand distortion by gravitational force when suspended freely in an inverted receptacle or on a coated object. The gel is also of such a nature that it can be fluidized by the application of mechanical agitation as by shaking, stirring, vibrating, and the like.

As to the wax components in our compositions there may be used any of the following:

1. Crude and refined paraffin waxes having melting points in the range of 38°-74°C.
2. Crude and refined microcrystalline waxes having melting points in the ranges of 60°-95°C.
3. Synthetic Fischer-Tropsch type waxes, both crude and refined, having melting points in the range of 71°-120°C.

Certain vegetable, insect and animal waxes may also be used in our compositions in place of one or more of the above categories of waxes, without adversely affecting the physical, chemical and electrical characteristics of the compositions. Suitable vegetable, insect and animal waxes for this purpose are as follows:

Beeswax (Apis Mellifera)
Carnauba Wax (Corypha Cerifera)
Chinese Insect Wax (Coccus Cerifera)
Japan Wax (Rhus Succedaneum)
Myrtle Wax (Myrica Cerifera)
Spermaceti Wax (Physeter Macrocephalus)

Of the above animal, insect and vegetable waxes, the most useful are Beeswax, Carnauba Wax, Chinese Insect Wax and Spermaceti Wax: however, the other waxes listed will produce acceptable end products if used within the range we have specified for the wax content of our telephone cable filling composition and after suitable refining processes.

The microcrystalline slack wax may be substituted by a mixture of (1) brightstock oil, or a mineral oil having equivalent physical properties to brightstock oil, as previously discussed herein, and (2) refined or crude microcrystalline waxes.

The average molecular weight of the polybutene we use is in the range of 500–3,500. A mixture of polybutenes may be used, as long as the average molecular weight is within the range of 500–3500, and the product has the appropriate viscosity. Such polybutenes are viscous, oily liquids and are prepared by the polymerization of n-butene in the presence of a halide olefin polymerizing catalyst, or by other methods well known to those skilled in the art. The polybutene used in the compositions of this invention has a viscosity in the range of about 18,000 to about 22,000 S.U.S./98.8°C.

Polybutenes suitable for use as a constituent in the compositions of this invention are those having the following characteristics:

| | |
|---|---|
| Specific Gravity/15.6/15.6°C. | 0.917 |
| Viscosity/37.8°C. | 936,000 SUS |
| Color APHA | 20 |
| Flash Point C.O.C. °C | 271 |
| Fire Point C.O.C. +C | 304.5 |
| Pour Point °C | +15.6 |
| Total Chlorides ppm | <5 |
| Total Sulphur ppm | <10 |
| Water Content | Nil |

Suitable brightstock oils may be readily obtained from petroleum refiners; likewise with microcrystalline slack waxes which are by-products of petroleum refining. A synthetic paraffin wax we have found particularly useful in formulating our products is one obtained from SASOL LTD. of South Africa, and sold under the Trademark "PARAFLINT V.I.." Other suitable waxes of this general type, known in the trade as "Fischer-Tropsch" waxes are available from BASF in Germany, and from other sources.

In the compositions of this invention the brightstock oil/microcrystalline slackwax/polybutene/synthetic paraffin wax blend produces a soft, rather viscous "petrolatum type" material which, of its own accord, is not completely satisfactory for the purpose being considered, i.e., for filling telecommunications cables. By dispersing the correct grade of finely divided silica (silica flour) under the appropriate conditions, a gel-like structure is formed, which structure is sufficiently stable to preclude the separation of any of the components during storage, filing and/or use. The silica flour, i.e., gelling agent, produces a gel such that although the gel structure is lost on liquefaction, it is generated on cooling. The oil/microcrystalline slackwax/polybutene/synthetic wax blend may be considered as one major component, formulated to introduce inherent strength into the final gel structure, with the silica flour acting as the second major component, the gelling agent.

As previously stated the gelling agent used in the compositions of the present invention is finely divided silica. This material may also be considered as the filler in the composition. The filler used is variously known as: silica flour, fumed silica, pulverized silica, atomized silica, or micronized silica. The proportion of filler to gel-like substance required depends (a) on the desired end liquid viscosity characteristics, (b) on the degree of hardness desired and (c) on the character and particle size of the filler. The character of the filler includes the shape and surface properties of the individual particles; and the character of the particles determines the end liquid viscosity and hardness characteristics. Plate-shaped or needle-like particles will reduce the viscosity of the jelly-like substance more than spheroidal particles. The smaller the particle size, the smaller the amount of filler required.

Such a composition has thixotropic properties: that is, when it is caused to move or is agitated for example by pumping, its viscosity is reduced. In the case of flat or needle-like particles this viscosity reduction is assisted by the alignment of the particles with the direction of motion. When the compound is substantially at rest the particles will be randomly directed, and thus assist in increasing the viscosity. The particle size range of silica flour varies very considerably; however, that used in the compositions of this invention may range anywhere from 0.0007 to 0.050 microns. Silica flours we have found quite satisfactory for use in the present invention are those designated by the trademark CAB-O-SIL. The following is a description of this particular material. CAB-O-SIL is one of the purest silicas commercially available. On a dry basis, it is 99 percent silicon dioxide and is practically free from contaminating metallic oxide. It contains no calcium, sodium or magnesium. CAB-O-SIL is so pure it meets the requirements of the FDA for use in foods in concentrations up to 2 percent.

Particles of CAB-O-SIL range in size from 70 to 500 angstroms or 0.007 to 0.050 microns. The physical appearance is that of a fluffy, snow white, super fine powder of extremely low bulk density. CAB-O-SIL particles are finer than those of the finest grades of rubber reinforcing carbon blacks. They are as fine as cigarette smoke.

When thoroughly dispersed and mixed with clear liquids such as mineral oil and turpentine, a transparent product is obtained. When dispersed and mixed with liquids such alkyd vehicles, polyester resins, dioctyl phthalate and other plasticisers and varnishes, a translucent product is produced. The refractive index of 1.46 is close to that of many organic liquids and therefore dispersions are relatively transparent or translucent. For example, a dispersion of CAB-O-SIL in butyl alcohol results in a perfectly clear suspension. CAB-O-SIL is made by a vapour phase process. It is produced by the hydrolysis of silicon tetrachloride at 1,100°C. This process produces a colloidal silica of exceptional purity. CAB-O-SIL, because it is produced at a high flame temperature, is generally classified as a "fumed" silica.

From the physical properties and surface characteristics stems the ability of CAB-O-SIL fumed silica to impart thickening and thixotropic control to liquids.

When CAB-O-SIL is dispersed in a liquid system, the chain-like formations join each other and form a network type of structure. This reduces the ability of the liquid to flow and results in increased viscosity or thickening. Upon agitation or shear, the network structure breaks down and reforms after agitation stops. When a gel reverts to a liquid upon agitation and reforms as a gel when agitation stops, the liquid is commonly known as being thixotropic. When very small amounts of CAB-O-SIL are dispersed in a liquid system, there is a limited amount of hydrogen-bonding, because the chains are generally too far apart to bond in a closely knit formation. By increasing the concentration of CAB-O-SIL to a point where there is a sufficient number of CAB-O-SIL chains which have hydrogen-bonded to each other, the desired thickening or thixotropy can be obtained.

A particularly suitable silica flour for the purpose of the present invention is that known under the Trademark "Cabosil M5" which has a particle size of 0.012 microns. Other silica flours which have been found to be satisfactory in the present invention are those known under the Trademarks "Syloid 224," "Syloid 308," "Gasil 23," "Tixosil 38A," "Zeosil 39" and "Cabosil M7." The use of the proper grade of finely divided silica, plus the correct incorporating technique, are the key to the manufacture of an acceptable composition according to this invention.

The amount of finely divided silica employed may range from about 0.5 to about 8.0 percent by weight of the composition. Preferably, however, we employ an amount of finely divided silica ranging from about 0.5 to about 5.0 percent by weight of the composition. Still more preferabaly, the finely divided silica is used in an amount ranging from about 1.0 to about 3.0 percent by weight of the composition.

As an optional ingredient there may be included up to about 1.0 percent by weight of an antioxidant. Any of the well known antioxidants for stabilizing organic substances and materials may be used: for instance; suitable antioxidants for use in a composition of this invention are those disclosed in British patent specification No. 1,117,771 of Union Carbide Corporation, published June 26, 1968 and in U.S. Pat. No. 3,156,728 of Orloff et al., granted Nov. 10, 1964; and also the reference "Autoxidation and Antioxidants," Lundberg, (1962), Interscience Publishers, Inc., New York.

If desired, there may be added to our compositions as an optional ingredient, minor amounts of a "tackiness" agent: this could be either a resinous material or a material such as high molecular weight polyisobutylene.

The cable filling compositions of the present invention are prepared according to the following procedure:

a. The high viscosity, mineral oil and microcrystalline wax are blended, and are heated to approximately 110°C., at which temperature the blend is passed through an adsorbent such as activated clay to remove polar and color bodies.

b. The thus-treated blend is heated to approximately 120°C., and the second, different type of wax, e.g., synthetic wax is then added, and the batch stirred until the wax is dissolved. If any antioxidant is to be included in the compositions, it is added at this stage.

c. The finely divided silica (e.g., silica flour) is then added in small increments and thoroughly dispersed with high speed, high shear stirring until complete uniformity has been achieved.

d. Polybutene is added as the final component, and is thoroughly mixed into the batch, the temperature being maintained at 100° – 110°C.

As previously stated, the key to making an acceptable cable filling composition according to this invention is the proper dispersion of the finely divided silica, as well as the use of the proper grade of finely divided silica.

As suitable equipment for effecting the high speed, high shear stirring there may be used any high speed stirrer known to those skilled in the art, as long as it can impart sufficient shear energy to the composition. For instance, mixers such as the "Lightning Mixer" (trade mark), the "Cowles Dissolver" (trade mark), the "Twin Daysolver" (trade mark) and various types of turbine mixers such as are described in pages 1210–1211 of Perry, "Chemical Engineers' Handbook", 3rd Ed., (1950), McGraw-Hill Book Co., New York, are suitable. Also suitable are high speed high shear dispersion devices such as are described in Chapter 6 of the book "Practical Emulsions," 3rd Edition, Vol. 1, Bennett et al., (1968), Chemical Publishing Company, Inc., New York.

The following example represents a preferred composition and method of preparation in accordance with the present invention. The percentages are given by weight, relative to that of the whole composition.

Example

| | |
|---|---|
| 65.9% | High Viscosity Mineral Oil* |
| 14.3% | Microcrystalline slackwax |
| 9.5% | Polybutene—Average Molecular Weight—2700 |
| 7.1% | Fischer-Tropsch Synthetic Paraffin Wax m.p. in range 71–120°C. |
| 11 3.2% | Silica Flour |

*Having the physical characteristics previously recited in the specification for this material The high viscosity mineral oil and microcrystalline slackwax are blended, and are heated to approximately 110°C. This blend is then passed at that temperature through an activated clay column to remove polar and colour bodies. When a sufficient improvement in colour/polar body content has been achieved, the blend is pumped into a mixing vessel where the synthetic or natural paraffin wax (and antioxidant — if desired) is added and dissolved. The silica flour is then fed into the batch in small increments and is stirred in at high speed using a high shear stirring device for this purpose. When complete dispersion of the appropriate amount of silica flour is achieved, the polybutene (average molecular weight 2700) is then blended in.

The compositions of this invention may be used to fill telephone cables by methods known in the art. Generally speaking, the composition is heated until molten (although it may also be used in the plastic solid state) and is then applied to plastic insulated telephone wires, at one or more filing points during the cable's manufacture, the composition being maintained at such a temperature as (a) not to "set-off" on contact with the cold cable and (b) not to exude from the interior of the cable after it has been filled. Arrangements such as disclosed, for example, in British patent specification No. 1,120,011, published July 17, 1968; British patent specification No. 1,136,344, published Dec. 11, 1968; British patent specification No. 1,293,942 published Oct. 25, 1972 or U.S. Pat. No. 3,607,487 of Biskeborn et al., granted Sept. 23, 1971, may be used for the application of our inventive filling compositions.

Our compositions were evaluated using the following tests:

a. High Temperature Melting Point — ASTM D127 and ASTM D566. (The minimum desired temperature for compositions of the type with which this invention is concerned, is 80°C. as measured by ASTM D566 and 85°C. as measured by ASTM D127.)

b. Syneresis — i.e., the tendency to separation of liquid fractions from a formulation. There is no standarized test that is known for determining this property; however, it has been found that compounds held at 20° – 30°C. below their ASTM D127 drop points for periods of 7 – 14 days will show signs of liquid separation, if this is a characteristic of the compound.

c. Plasticity at Low Temperature (−40°C. -/ −40°F.) — A company devised test which consists of placing a quantity of the compositions in a suitable container — usually 750 grams of the composition in a 1,000 ml metal container and chilling to the required test temperature in 3 stages over a 6 hour period and measuring the hardness of the material at the final temperature by meeans of Cone Penetration. Additionally thin layers of the composition (5–10 mils) may be coated onto thin metal plates (20 –30 mils) and cooled to the required test temperature, at which temperature the plate/compound is flexed and signs of cracking/fissuring noted. Our compositions were tested using both the above methods.

d. Void Formation — This is a company devised test which is related to the Coefficient of Expansion of the composition as measured at different temperatures over a given temperature range, the specific expansion values obtained being plotted as a curve on linear graph paper. The enclosed figure of drawings shows a typical coefficient of expansion/contraction curve for a composition approximating that described in the example herein. In general terms, the lower the Coefficient of Expansion characteristics for a given composition produced during the test cycle the more desirable is the composition for this particular end use; this is particularly so the closer the curve is to a continuous value of 0.0007/°C. which is the average Coefficient of Expansion value for petroleum oils. The test method used to measure the compound's Coefficient of Expansion is a Company devised test in which a small sample (approximately 10 grams) of compound is cooled under applied pressure to the lower test temperature and is tempered at this temperature for 12 hours. The sample is then raised in temperature, at a controlled rate, the expansion undergone by the compound during the heating cycle being mechanically and electrically transmitted to a recording chart.

e. Dielectric Constant and Change in Dielectric Constant with Increase in Frequency — ASTM D150 — In the case of telephone cable filling compositions it is desirable that there be a minimum change in the Dielectric Constant of the filling composition with change in test frequency. The Dielectric Constant of air is 1. Ideally any filling compound should have this value for Dielectric Constant; however, most petroleum based compositions have Dielectric Constants in the range of 2.0 – 2.4. Our Cable filling compositions fall within this range at all measured frequency levels.

f. Compatibility with Insulating Materials — a Company devised test. Plastic coated telephone cable wires are immersed in the compositions to be tested at a prescribed temperature for a prescribed period of time and are subsequently air aged after which air aging the physical changes which have occurred in the plastic insulation, as the result of its immersion in the compound and subsequent air aging are noted.

g. Penetration /25° and 65°C — ASTM D937 — it is vital that the compositions for use as telephone cable filling compounds have acceptable penetration values, not only at the standard test temperature of 25°C. but also at an elevated temperature. For this purpose a temperature of 65°C. was selected as being both a realistic and meaningful temperature. It is possible to formulate a composition having an acceptable penetration at 25°C. only to have this composition disintegrate at 65°C. The meeting of acceptable cone penetration values at both temperatures is of prime importance in formulating compositions of this general type.

h. Volume Resistivity/ 100°C. — ASTM D257 — This test relates to the freedom of the composition from moisture and ionic or solid conducting contaminants which have an adverse effect on the performance of the finished telephone cable. Resistivity is also recommended as a test to determine when a cable filling composition has deteriorated beyond an acceptable point for continued in-plane usage.

i. Viscosity — Brookfield Viscosimeter Method — To produce compositions having an acceptable viscosity is a prime requirement. It is possible to produce compositions of such a viscous consistency that full filling of the cable interstices is not possible in the time period allowed in plant production. Formulating to an acceptable viscosity, and for the composition to have such a viscosity, is of critical importance in producing "fully filled" cables.

The following typical test data were obtained for the composition of the example, previously described:

Typical Test Data - Formula A

| | |
|---|---|
| Viscosity (Brookfield) 98.8°C (ASTM D 2669) | 300 cps |
| Drop Point (ASTM D 127) | 95°C |
| Plasticity/ −40°C | No cracking observed |
| Dielectric Constant/100°C (ASTM D 150) | 2.2 |
| Volume Resistivity/100°C (ASTM D 257) | 3×10$^{10}$ ohms meter |
| Cone Penetration/25°C (ASTM D 937) | 90 |
| Cone Penetration/65°C (ASTM D 937) | 160 |
| Dissipation Factor/100°C/60 Hz | 0.0045 |

While certain embodiments of this invention have been particularly described herein, it is to be understood that the invention is not to be limited to specific embodiments, since, for example, variations in the ingredients of the compositions, and/or in the proportions of ingredients, and/or in process conditions for the manufacture of these compositions, will be contemplated by those skilled in the art, without departing from the broadest aspects of the invention. It is therefore intended that the invention be limited only by the claims which follow.

What is claimed is:

1. A composition suitable for use in filling telecommunications cables and the like, comprising:

1. 50.0 – 70.0 percent of a high viscosity mineral oil meeting the following general specification:

| | |
|---|---|
| Viscosity/98.8°C. | 120 SUS – 220 SUS |
| Viscosity/37.8°C. | 2000 SUS – 3500 SUS |
| Flash Point | 204.4°C. minimum |
| Specific Gravity/15.6°C. | 0.875 – 0.925 |
| Color | ASTM 2 – ASTM 8 |
| Boiling Range (at atmospheric pressure) | 260°C. – 704.5°C. |

2. 5.0 – 20.0 percent microcrystalline slackwax, or of an equivalent of said microcrystalline slackwax, said equivalent consisting essentially of a mixture of a microcrytalline wax with a high viscosity mineral oil having the specification recited above;

3. 3.0 – 10.0 percent of at least one wax selected from the group consisting of (a) paraffin waxes having melting points in the range of 38° – 74°C., (b) synthetic Fischer-Tropsch type waxes having melting points in the range of 71° – 120°C., and (c) natural waxes selected from the group: Beeswax, Carnauba wax, Chinese insect wax, Japan wax, Myrtle wax and Spermaceti wax;

4. 5.0 – 15.0 percent polybutene, of average molecular weight in the range of 500 – 3,500; and 5. from about 0.5 to about 8.0 percent finely divided silica of average particle size in the range of 0.0007 – 0.05 micron, said percentages of ingredients being by weight, based on the entire composition.

2. A composition as defined in claim 1 in which the high viscosity mineral oil is a brightstock oil.

3. A composition as defined in claim 1 wherein the finely divided silica is present in an amount ranging from about 0.5 to about 5 percent by weight of said composition.

4. A composition as in claim 3 wherein the finely divided silica is present in an amount ranging from about 1.0 to about 3.0 percent by weight of said composition.

5. A composition as defined in claim 1, said composition having the following physical characteristics:

| | |
|---|---|
| Viscosity/98.8°C. | 150–400 cps. |
| Cone Penetration/25°C. (ASTM D937 Method) | 80–120 1/10 mm. units |
| Drop Point (ASTM D127 Method | 85°–95°C. |
| Dissipation Factor/100°C./60 Hz | 0.005 maximum |
| Volume Resistivity/100°C. | 1×10$^{10}$ ohms meter minimum. |

6. A composition according to claim 1 wherein ingredient 2 is microcrystalline slackwax and the wax constituent is a Fischer-Tropsch synthetic paraffinic wax, and the finely divided silica is present in an amount of from 0.5 – 5.0 percent by weight of the composition.

7. A composition according to claim 1, which includes also an antioxidant in an amount of up to about 1.0 percent by weight of said composition.

8. A composition according to claim 1 having the following formulation:

| | |
|---|---|
| High Viscosity Mineral Oil (as specified in claim 1) | 60.0% – 70.0% |
| Microcrystalline slackwax | 10.0% – 20.0% |
| Polybutene(of average molecular weight 2700) | 5.0% – 15.0% |
| Fischer-Tropsch Synthetic paraffinic wax | 5.0% – 10.0% |
| Silica Flour | 1.0% – 5.0% | said percentages of ingredients being by weight, based on the composition.

9. A composition as defined in claim 8 wherein the silica flour has an average particle size of 0.012 microns.

10. A composition as defined in claim 8 having the following formulation:

| | |
|---|---|
| High Viscosity Mineral Oil | 65.9% |
| Microcrystalline slackwax | 14.3% |
| Polybutene, of average M.W.2700 | 9.5% |
| Synthetic paraffinic wax | 7.1% |
| Silica Flour | 3.2% | said percentages of ingredients being by weight, based on said composition.

11. A composition as in claim 1 wherein the high viscosity mineral oil constituent is a neutral or pale oil meeting the general specification set forth in claim 1.

12. A composition as in claim 1 wherein the polybutene constituent comprises a mixture of low molecular weight polybutenes of varying molecular weights and viscosities, said mixture having an average molecular weight within the range of 500 – 3,500.

13. A composition as in claim 1 wherein the wax constituent is a crude or refined paraffin wax having a melting point in the range of 38°–74°C.

14. A composition as in claim 1 wherein the wax constituent is a crude or refined synthetic Fischer-Tropsch type wax having a melting point in the range of 71°–120°C.

15. A composition according to claim 8, said composition meeting the following specifications:

| | |
|---|---|
| Viscosity (Brookfield) 98.8°C (ASTM D2669) | 300 cps |
| Drop Point (ASTM D127) | 95°C |
| Plasticity/–40°C | No cracking observed |
| Dielectric Constant/100°C (ASTM D150) | 2.2 |
| Volume Resistivity/100°C (ASTM D257) | 3×10¹⁰ ohms meter |
| Cone Penetration/25°C (ASTM D937) | 90 |
| Cone Penetration/65°C (ASTM D937) | 160 |
| Dissipation Factor/100°C/60 Hz | 0.0045. |

16. Process for preparing a composition suitable for use in filling telecommunicatiaons cables, and the like, comprising the following steps in sequence:

a. blending together, with heating, the following ingredients:

i. a high viscosity mineral oil meeting the following general specifications:
Viscosity/98.8°C. - 120 SUS - 220 SUS
Viscosity/37.8°C. - 2000 SUS - 3500 SUS
Flash Point - 204.4°C minimum
Specific Gravity/15.6°C. - 0.875 - 9.925
Colour ASTM 2 - ASTM 8
Boiling Range (at atmospheric pressure) - 260°C. - 704°C, and ii. microcrystalline slackwax, or an equivalent of said microcrystalline slackwax, said equivalent consisting essentially of a mixture of a microcrystalline wax with a high viscosity mineral oil having the specification recited above;

b. adding to the blend at least one wax selected from the group consisting of (i) paraffin waxes having melting points in the range of 38° – 74°C., (ii) synthetic Fischer-Tropsch type waxes having melting points in the range of 71° – 120°C., and (iii) natural waxes selected from the group: Beeswax, Carnauba wax, Chinese insect wax, Japan wax, Myrtle wax and Spermaceti wax, and allowing said wax to dissolve;

c. adding finely divided silica of average particle size in the range of 0.0007 – 0.05 micron in small increments to the mixture, while subjecting the latter to high velocity, high shear mixing, until complete dispersion of said silica in the mixture is achieved; and d. incorporating into the mixture resulting from step (c), polybutene of average molecular weight in the range of 500– 3500;

said ingredients being employed in the following relative proportions:

| | |
|---|---|
| Ingredient (i) | 50.0%–70.0% |
| Ingredient (ii) | 5.0%–20.0 |
| Wax (as recited in paragraph (b) above) | 3.0%–10.0% |
| Polybutene | 5.0%–10.0% |
| Finely divided silica | 0.5%–8.0%, | said percentages of ingredients being by weight, based on the entire composition.

17. A process as in claim 16 wherein, in step (a), said high viscosity mineral oil and microcrystalline slackwax are blended together.

18. The process of claim 16 wherein the blend of high viscosity mineral oil and microcrystalline slackwax are heated to approximately 110°C and then passed through a column of adsorbent material to remove polar and color bodies from said blend.

19. A process as in claim 16 wherein the amount of finely divided silica used is in the range of about 0.5 to about 5 percent by weight of said composition.

20. A process as in claim 16 wherein the amount of finely divided silica used is in the range of about 1.0 to about 5.0 percent by weight of said composition.

21. A process according to claim 16 wherein ingredient (ii) is microcrystalline slackwax, and the wax employed in step (b) is a Fischer-Tropsch synthetic paraffinic wax, and the finely divided silica is employed in an amount of from 0.5 – 5.0 percent, based on the entire composition.

22. A process as defined in claim 16 wherein the high viscosity mineral oil is a brightstock oil.

23. A process as defined in claim 16, wherein there is included also an antioxidant, in an amount of up to about 1.0 percent by weight of the composition, said antioxidant being incorporated into the composition together with the paraffin or synthetic Fischer-Tropsch type wax or natural wax in step (b).

24. A process as in claim 16, wherein the ingredients used and their relative proportions, are as follows:

| | |
|---|---|
| High Viscosity Mineral Oil (as specified in claim 17) | 60.0% – 70.0% |
| Microcrystalline slackwax | 10.0% – 20.0% |
| Polybutene (of average molecular weight 2700) | 5.0% – 15.0% |
| Fischer-Tropsch synthetic paraffinic wax | 5.0% – 10.0% |
| Silica Flour | 1.0% – 5.0% | said percentages of ingredients being by weight based on the composition.

25. A process as in claim 24 wherein the ingredients used, and their relative proportions, are as follows:

| | |
|---|---|
| Brightstock oil | 65.9% |
| Microcrystalline slackwax | 14.3% |
| Polybutene, of average molecular weight 2700 | 9.5% |
| Fischer-Tropsch synthetic paraffinic wax | 7.1% |
| Silica Flour | 3.2% | the percentages of ingredients being by weight, based on the composition.

26. A process according to claim 18 wherein the blend of high viscosity mineral oil and microcrystalline slackwax, after being passed through said column of adsorbent material, is heated to approximately 120°C. at which temperature step (b) is carried out.

27. A process as defined in claim 24 wherein the silica flour has an average particle size of 0.012 microns.

* * * * *

UNITED STATES PATENT AND TRADEMARK OFFICE
CERTIFICATE OF CORRECTION

PATENT NO. : 3,893,839
DATED : July 8, 1975
INVENTOR(S) : Frederick Cartmer Elliot et al.

It is certified that error appears in the above-identified patent and that said Letters Patent are hereby corrected as shown below:

Col. 1, line 24, after "a" insert --cable through punctures--;

line 24, delete "(2)".

Col. 4, line 17, delete ".925" and substitute --0.925--.

Col. 5, line 37, change "Dissipation Factor/100°C Hz" to

--Dissipation Factor/100°C/60 Hz--.

Col. 6, line 36, delete "+C" and substitute --°C--.

Col. 9, line 37, delete "11 3.2%" and substitute --3.2%--;

line 59, delete "filing" and substitute --filling--.

Col. 10, line 26, delete "meeans" and substitute --means--.

Col. 13, cl. 16, delete "telecommunicatiaons" and substitute

--telecommunications--.

Signed and Sealed this

Third Day of August 1976

[SEAL]

*Attest:*

RUTH C. MASON
*Attesting Officer*

C. MARSHALL DANN
*Commissioner of Patents and Trademarks*